United States Patent
He et al.

(10) Patent No.: US 6,370,935 B1
(45) Date of Patent: Apr. 16, 2002

(54) ON-LINE SELF-CALIBRATION OF MASS AIRFLOW SENSORS IN RECIPROCATING ENGINES

(75) Inventors: Chuan He; Paul R. Miller, both of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/173,995

(22) Filed: Oct. 16, 1998

(51) Int. Cl.[7] .................. G01F 25/00; F02B 47/08; G06D 7/02
(52) U.S. Cl. ......................... 73/1.34; 702/100
(58) Field of Search ............... 73/1.34, 1.35, 73/118.2; 701/108, 31; 702/100; 123/478, 480, 486, 488, 494, 568.21, 568.22, 568.11, 568.16

(56) References Cited

U.S. PATENT DOCUMENTS

| | | | |
|---|---|---|---|
| 4,173,205 A | 11/1979 | Toelle | 123/119 A |
| 4,253,156 A | 2/1981 | Lisle et al. | 73/861 X |
| 4,402,217 A * | 9/1983 | Higashiyama | 73/117.3 |
| 4,437,340 A | 3/1984 | Csere et al. | 73/118 |
| 4,467,775 A * | 8/1984 | Buck et al. | 123/568.27 |
| 4,505,169 A | 3/1985 | Ganoung | 74/858 |
| 4,599,694 A | 7/1986 | Aposchanski et al. | 73/195 X |
| 4,644,920 A | 2/1987 | Abe et al. | 123/479 |
| 4,719,893 A | 1/1988 | Buslepp et al. | 123/571 |
| 4,986,243 A | 1/1991 | Weissler, II et al. | 123/488 |
| 5,050,560 A | 9/1991 | Plapp | 123/488 |
| 5,070,846 A | 12/1991 | Dudek et al. | 123/488 |
| 5,107,812 A | 4/1992 | Takamoto et al. | 123/447 |
| 5,150,694 A | 9/1992 | Currie et al. | 123/569 |
| 5,226,393 A | 7/1993 | Nagano et al. | 123/478 |
| 5,241,857 A | 9/1993 | Schnaibel et al. | 73/18.2 |
| 5,270,935 A | 12/1993 | Dudlek et al. | 73/118.2 X |
| 5,273,019 A | 12/1993 | Matthews et al. | 123/571 |
| 5,394,331 A | 2/1995 | Dudek et al. | 193/788 X |
| 5,408,871 A * | 4/1995 | Lieder et al. | 73/118.1 |
| 5,488,938 A * | 2/1996 | Oh-chi | 73/117.3 |
| 5,497,329 A | 3/1996 | Tang | 73/118.2 X |
| 5,503,129 A | 4/1996 | Robichaux et al. | 123/371 X |
| 5,515,832 A | 5/1996 | Bidner et al. | 123/571 |
| 5,515,833 A | 5/1996 | Cullen et al. | 123/571 |
| 5,517,971 A | 5/1996 | Nishimura et al. | 123/494 |
| 5,537,981 A | 7/1996 | Suedholt et al. | 123/478 |
| 5,544,079 A * | 8/1996 | Saikalis | 73/118.2 X |
| 5,560,199 A * | 10/1996 | Agustin et al. | 60/274 |
| 5,621,167 A | 4/1997 | Fang-Cheng | 73/118.1 |
| 5,638,788 A | 6/1997 | Sanvido et al. | 123/339.2 |
| 5,668,313 A | 9/1997 | Hecht et al. | 73/118.2 |
| 5,727,533 A | 3/1998 | Bidner et al. | 123/571 |
| 5,750,889 A | 5/1998 | Kowatari et al. | 73/118.2 |
| 5,791,319 A * | 8/1998 | Friedrick et al. | 123/568.21 X |

* cited by examiner

Primary Examiner—Thomas P. Noland
(74) Attorney, Agent, or Firm—Barnes & Thornburg

(57) ABSTRACT

In an internal combustion engine having an exhaust gas recirculation system, a mass airflow (MAF) sensor is disposed at the air inlet to an engine cylinder. For engines with an EGR recirculation path, the sensor is upstream of that path. The MAF sensor provides signals to an engine control module (ECM) indicative of the mass airflow of the intake charge to the engine. A system and method for on-line self-recalibration of the MAF sensor and the MAF values includes comparing the sensed MAF value with an ideal MAF value obtained using data from sensors downstream from the MAF sensor. If a comparison of the sensed versus the actual MAF values reveals that the MAF sensor is out of calibration, a regression analysis is applied to several data pairs of MAF sensor output magnitude and ideal MAF value to modify the relationship between MAF sensor output and sensed MAF value.

12 Claims, 4 Drawing Sheets

ON-LINE SELF-CALIBRATION OF MASS AIRFLOW SENSORS IN RECIPROCATING ENGINES

BACKGROUND OF THE INVENTION

The present invention concerns the calibration of mass airflow sensors, particularly sensors used with reciprocating combustion engines. More specifically, the present invention relates to a system and method for effecting a calibration on-line or while the engine is in normal operation. The invention further contemplates a self-calibration approach that does not require additional instrumentation or sensors beyond those already present in the engine control system.

Intake mass airflow (MAF) sensors or meters have been widely used in reciprocating combustion engines, particularly with the advent of electronic controls for such engines. One typical application for a MAF sensor is in regulating the air/fuel ratio provided to each engine cylinder. In an application of this type, the engine control module receives signals from the MAF sensor indicative of the mass airflow being drawn into the engine cylinder(s). The ECM can then direct the fuel injector assembly to deliver a particular quantity of fuel into the cylinder(s) to maintain predetermined air/fuel ratios. These ratios can be based upon software algorithms stored within and executed by the ECM or upon a table look-up sequence, also executed by and stored within the ECM.

In another application, MAF sensors are used in exhaust gas recirculation (EGR) control. In order to meet increasingly stringent emissions requirements, most internal combustion engines may include some form of EGR device. In one typical EGR system, a conduit is provided between the cylinder exhaust port and the cylinder inlet port to recycle a certain proportion of exhaust gases back into the inlet air stream. A valve is imposed within the EGR flow path to control the amount of recirculated exhaust gases. While EGR systems have a very positive effect on controlling engine NOx emissions, these systems have a detrimental effect on the engine performance and on other emissions, unless the EGR is well controlled in relation to the intake mass airflow. Thus, the MAF sensor provides data to the ECM that is used in EGR control routines to determine the amount by which the EGR valve is opened, or other mechanisms affecting EGR flow are exercised, to thereby control the recirculation of exhaust gases into the intake airflow.

In most reciprocating engine applications, the MAF sensor is called upon to provide transient airflow information over very large flow ranges between engine idle and full throttle. For example, in a typical diesel using EGR, fresh intake airflow can have a max/min ratio of 20:1 or more.

Like any sensor, whether electrical, electro-mechanical or mechanical, the MAF sensor is subject to output errors. In a typical case, a sensor can have a ±3% error when first manufactured. This error can increase to nearly 20% when the sensor is installed due to uncompensated installation effects.

Thermal MAF sensors are particularly susceptible to problems in maintaining accuracy in their output readings over the engine life. In order to overcome these problems, the MAF sensors can be recalibrated with the engine off-line, or shut down. A variety of systems have been developed for this off-line calibration process. Another problem with recalibration of the sensors is that the calibration is usually dependent upon specific details of the particular engine and intake air system installation. In most cases, the MAF sensor requires an installation specific calibration, which means that the technician performing the calibration must know engine specific data in order to accurately recalibrate the MAF sensor. Most known off-line calibration techniques are disfavored by customers and technicians alike, so that once a sensor is believed to be out of spec the preferred treatment is to replace the unit entirely.

SUMMARY OF THE INVENTION

In order to address the difficulties with prior off-line calibration approaches, the present invention contemplates a system and method for on-line recalibration of the MAF sensor, or more particularly of the sensed MAF values derived from the magnitude of the output of the sensor. Since the present invention contemplates an electronic or software based recalibration, the MAF sensor itself is unchanged so it need not be removed from the engine. The systems and methods of the present invention are implemented at points in the engine operation when the EGR valve can be momentarily closed.

In accordance with aspects of the present invention, a predetermined relationship is maintained between the output voltage of the MAF sensor and a mass airflow value used by the engine control routines. This predetermined relationship is maintained in a memory as a plurality of modifiable values. In one embodiment, these values correspond to constants for a non-linear equation relating MAF voltage to MAF value. In one specific embodiment, this equation takes the form of $\dot{m}_{air}=a(V_{MAF}+b)^c$, where the constants a, b and c are the modifiable values stored in memory. With this embodiment, the constants are initially set when the engine is new and remain unchanged until the MAF sensor falls out of calibration. The MAF value $\dot{m}_{air}$ is used by various engine control routines, such as routines governing emission controls.

In a further feature of this embodiment of the invention, a recalibration buffer is maintained in memory. The recalibration buffer includes associated data pairs of MAF output voltage $V_{MAF}$ and an ideal MAF value representative of an MAF value that would be generated by an ideally calibrated MAF sensor. In one embodiment, this ideal MAF value is obtained from a predetermined relationship involving outputs from engine condition sensors other than the MAF sensor. In one specific embodiment, these engine condition sensors include temperature and pressure sensors disposed at the intake manifold downstream from the MAF sensor and the EGR recirculation path. The present invention capitalizes on characteristics of cylinder air charges in which the ideal MAF value based on the condition sensors is substantially equal to the sensed MAF value for a properly calibrated MAF sensor when the EGR valve is closed.

In one preferred embodiment, if the difference between the sensed MAF value and the ideal MAF value exceeds a predetermined threshold, a recalibration procedure is implemented. According to this feature, a regression analysis is performed on the associated data pairs stored in the recalibration buffer. In the illustrated embodiment, this regression analysis generates new constants a, b and c so that the predetermined relationship equation adequately defines the relationship between the MAF voltage and the ideal MAF value in each pair. The results of the regression analysis are evaluated to determine whether the analysis meets certain predetermined quality standards. For example, an $r^2$ or an RMS evaluation can be used to ascertain whether the actual data pairs are adequately represented by the resulting modified equation.

If the regression quality standards are met, the calculated mass flow values using the new regression constants a, b and c, are compared to the calculated values using the prior regression constants. If the difference between the previous and present values is too great, the MAF sensor is flagged as being too far out of calibration for correction. If the difference is within limits, the new regression constants are stored in memory for subsequent use in calculating $\dot{m}_{Air}$ for use by the ECM engine control routines. In some cases, a comparison can be directly made between the current and prior regression constants a, b and c themselves to determine the extent of sensor miscalibration.

In accordance with the preferred embodiment, it is anticipated that the process of evaluating the sensed and actual MAF values will occur over several cycles. Consequently, the recalibration buffer will contain several data pairs for use in the regression analysis.

In an alternative embodiment of the invention, the predetermined relationship between MAF output voltage and MAF value is maintained in an adaptive look-up table stored in memory. In this embodiment, a plurality of discrete voltage values are paired with corresponding MAF values. Like the prior embodiment, the method implemented with this embodiment relies upon a comparison between sensed and ideal MAF values when the EGR valve is closed. The outcome of the comparison can be used to determine whether entries in the adaptive look-up table are modified. In a specific embodiment, the magnitude of the difference between the sensed and ideal MAF values can be used to determine the magnitude of the modification of the table entries. Preferably, the corresponding MAF values are incrementally changed as a result of the comparison.

It is one object of the present invention to provide a system and method for on-line recalibration of mass airflow values generated by an MAF sensor and used by engine control routines. A further object is to provide limits on when the recalibration occurs based upon a determination of the severity of the deterioration of the MAF sensor output.

One benefit of the present invention is that recalibration of the MAF sensor output is performed electronically, rather than physically, so that it can occur during normal operation of the engine. A further benefit achieved by the invention is that the recalibration can occur constantly throughout the life of the MAF sensor and/or engine. The system and methods of the invention permit on-line determination as to the state of the MAF sensor so that a sensor that is excessively out of calibration can be identified.

These and other object and benefits of the present invention can be readily discerned from the following written description and accompanying figures.

DESCRIPTION OF THE PREFERRED EMBODIMENTS

Figure 1:
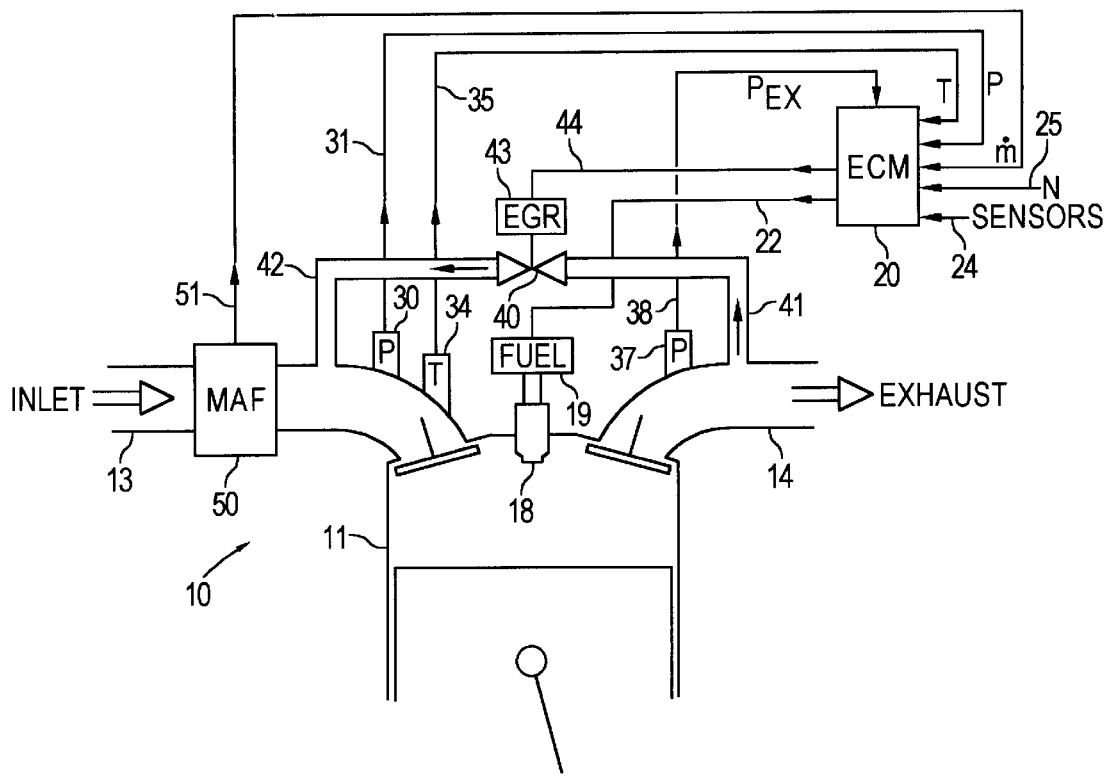
FIG. 1 is a schematic illustration of an electronically controlled internal combustion engine including an EGR system and a mass airflow sensor.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

The present invention contemplates a system and method for on-line calibration of a mass airflow (MAF) sensor for a reciprocating combustion engine. In the preferred embodiments, the engine is electronically controlled and utilizes signals from the MAF sensor in connection with certain engine control algorithms. The engine control algorithms use the air mass flow rate data, along with data from other engine condition sensors, to generate output signals for controlling the introduction of fuel to a cylinder and the timing of injection of that fuel, for example. It is understood that the present invention can be implemented for MAF sensors in a variety of engine configurations, such as diesel or gasoline fueled, turbocharged or supercharged, and with or without exhaust gas recirculation.

A typical engine 10 is shown in FIG. 1 that includes engine cylinders 11 fed by air through an intake manifold 13. The product of combustion within the cylinder(s) 11 is exhausted through exhaust manifold 14. Liquid fuel is provided through a fuel injector 18 fed by a high pressure fuel source 19 (such as a fuel pump, unit injector, unit pump, or common rail).

The engine 10 includes an engine control module (ECM) 20 that provides control signals 22 to the high pressure fuel source 19 in relation to engine control algorithms stored within the ECM. The ECM 20 receives inputs 24 from a variety of engine condition sensors, and speed input 25 from an engine speed sensor. A pressure sensor 30 and a temperature sensor 34 are provided at the intake manifold 13 to sense the condition of the intake air charge being provided to the engine cylinder(s) 11. The sensors 30, 34 produce signals 31, 35, respectively, indicative of the intake temperature and pressure that are provided to the ECM 20. An additional input signal 38 is generated by an exhaust pressure sensor 37 disposed at the exhaust manifold 14. All of these input signals are used in accordance with various algorithms executed by the ECM to control the engine performance.

In a further aspect of the engine 10, an exhaust gas recirculation (EGR) valve 40 can be provided between an EGR inlet conduit 41 and an outlet conduit 42. The inlet conduit 41 communicates with the exhaust manifold 14 to receive a certain proportion of the exhaust gases. The valve 40 controls the flow of the exhaust gases from the inlet conduit 41 to the outlet conduit 42. The outlet conduit 42 is in communication with the intake manifold 13 to provide for the recirculation of those exhaust gases. The state of the EGR valve 40 is determined by an EGR controller 43. The EGR controller 43 responds to signals 44 generated by the ECM 20.

Since recirculated exhaust gases can have a detrimental effect on the combustion process, the amount of exhaust gas is controlled in relation to the mass airflow through the intake manifold 13. Consequently, a mass airflow sensor 50 is provided to generate a signal 51 indicative of this measurement.

The signals provided to the ECM 20 condition the mass airflow value for use by the engine control routines.

In one specific routine, an EGR ratio is calculated. The EGR ratio represents the ratio of the mass flow rate of the recirculated exhaust gas to the total charge mass flow rate being provided to the cylinders 11. The EGR mass flow rate can be represented by the difference between the charge mass flow rate and the intake air mass flow rate prior to the outlet conduit 42 of the EGR system. Thus, the EGR ratio can be represented according to the following equation:

$$EGR \text{ ratio} = \frac{\dot{m}_{EGR}}{\dot{m}_{Chg}} = \left( \frac{\dot{m}_{Chg} - \dot{m}_{Air}}{\dot{m}_{Chg}} \right) \quad (1)$$

The output of the MAF sensor 50 represents the intake air mass flow rate $\dot{m}_{air}$. This sensed air mass flow rate is subtracted from a calculated charge mass flow rate $\dot{m}_{chg}$ to obtain the value $\dot{m}_{egr}$. The value $\dot{m}_{egr}$ or the EGR ratio of equation (1) can be supplied to other engine control algorithms executed by the ECM 20. Other methods of determining $\dot{m}_{egr}$ are possible and could be used together with the methodology described here.

The charge mass flow rate $\dot{m}_{chg}$ can be based upon a known equation for an internal combustion engine, such as a four-stroke engine. According to this equation;

$$\dot{m}_{chg} = \eta_{vol} \left( \frac{P_{Chg} \times V_D}{R_{Chg} \times T_{Chg}} \right) \left( \frac{N}{2} \right) \quad (2)$$

The charge mass flow rate is a function of the pressure of the charge, as measured by the pressure sensor 30, and the charge mixture temperature, as measured by the temperature sensor 34. In addition, the charge mass flow rate is a function of the engine speed N. The value $\eta_{vol}$ is the engine volumetric efficiency, while $V_D$ is the engine displacement. The constant $R_{Chg}$ is the gas constant of the charge mixture, while $P_{Chg}$ and $T_{Chg}$ are the charge gas absolute pressure and temperature, respectively. With this latter equation (2), the mass flow rate of charge into the cylinders 11 can be calculated. The sensors providing information for this latter calculation, namely the engine speed, pressure and temperature sensors, are less susceptible to error and degradation than the mass airflow sensor 50. However, as expressed in the first equation, the EGR ratio is a significantly related function of the intake air mass flow rate, as measured by the MAF sensor. In practice, the EGR ratio calculation has a very high sensitivity to small errors in the intake air mass flow rate. It is important that the MAF sensor 50 maintain its calibration accuracy throughout the life of the engine.

Figure 2:
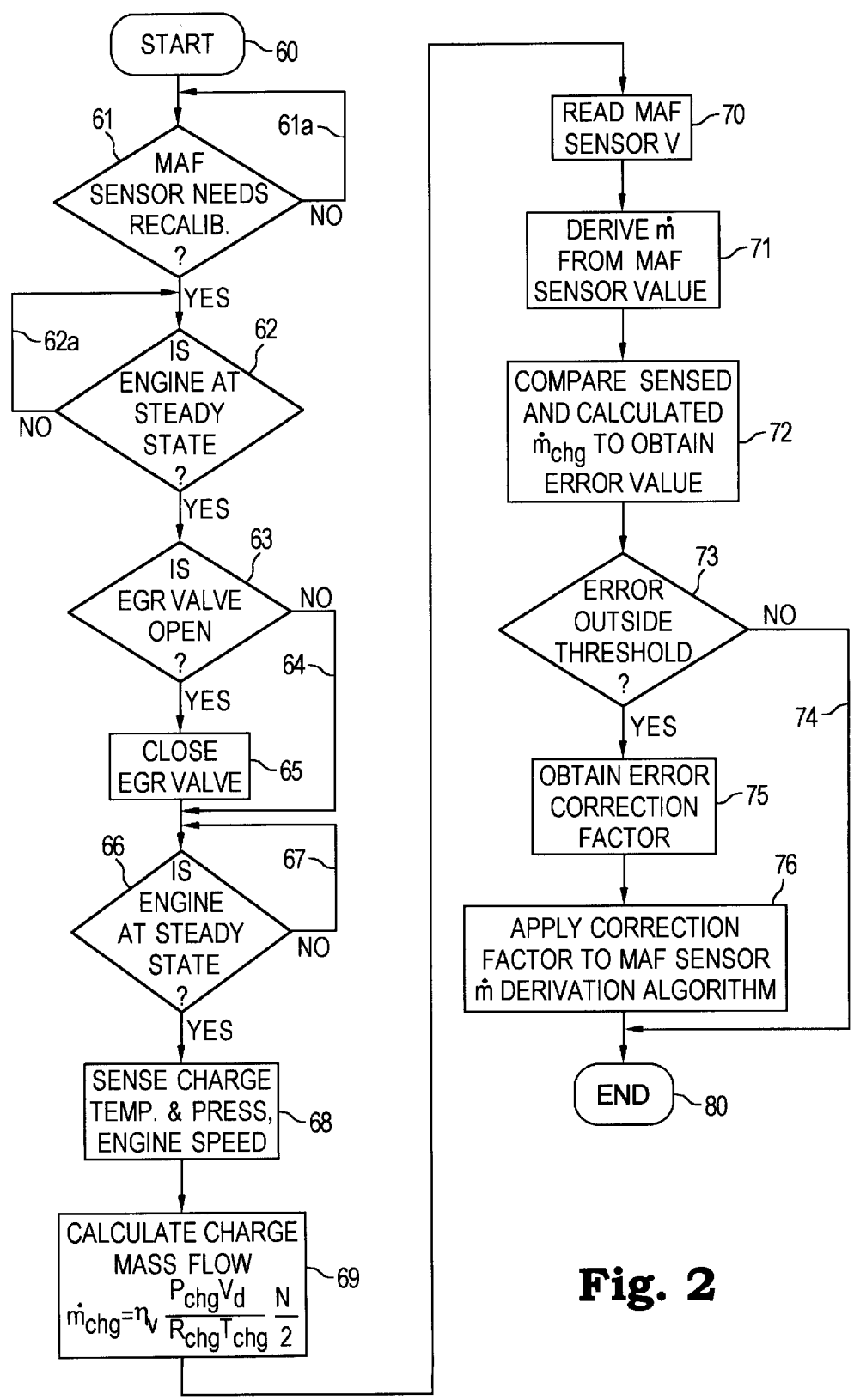
FIG. 2 is a flowchart of a sequence of steps executed by a control module for the on-line calibration of an intake mass airflow sensor.

In accordance with the present invention, the ECM 20 includes a software routine that accomplishes on-line calibration of the MAF sensor 50. Of course, an additional controller or microprocessor can be provided to perform the software routine, as required by particular engine applications. The routine, as depicted in the flowchart of FIG. 2, does not alter the output signal 51 from the MAF sensor 50 itself. Instead, the software routine recalibrates the conditioned MAF value that is used by the ECM routines.

The starting step 60 shown in the flowchart of FIG. 2 can be initiated by software within the ECM 20. The software can respond to an indication of an error condition within the engine control modules or by an external request, such as might be generated by a hand-held engine diagnostics tool. In the preferred embodiment, the steps of the inventive method occur continuously with other engine control routines executed by the ECM 20. With this approach, the calibration of the MAF sensor is constantly evaluated and its performance maintained over the life of the engine.

Alternatively, the ECM can commence the on-line calibration procedure at predetermined intervals that can be based upon actual time or engine miles. For example, the software within the ECM can start the sequence at step 60 every 5,000 miles of engine operation. If this alternative approach is utilized, conditional step 61 can be included to determine whether the MAF sensor is in line for recalibration. If not, then the routine loops back at 61*a*.

Preferably, the sensor recalibration sequence runs on a continuous basis when the engine is running. As a result, the mass airflow sensor 50 is being constantly evaluated and its performance maintained over the life of the engine. The recalibration sequence commencing at step 60 is executed repeatedly with other ECM control routines. In this instance, the conditional and loop steps 61, 61*a* can be dispensed with and program flow can follow directly to step 62.

In conditional step 62, a determination is made whether the engine is operating in a steady state condition. Dynamics of airflow through the intake manifold can lead to differences in the flow rate between the entrance to the manifold and the intake valve at the engine cylinder(s). In a steady state condition, the airflow sensed at the MAF sensor 50 is substantially identical to the airflow into the engine cylinder(s). At this operating condition, the sensed mass airflow can be compared to the calculated charge flow, using the equation (2) set forth above.

The steady state condition can be ascertained in a variety of ways by reading the various sensors providing signals to the ECM 20. For example, the engine speed signal 25 and the intake charge pressure and temperature signals 31 and 35, can be evaluated over a predetermined time interval. If those three signals fall in a predetermined range within that time interval, it can be determined that the engine is operating at a steady state condition. The routine cycles along loop 62*a* until a steady state condition is established.

In the next step 63, it is determined whether the EGR valve 40 is already closed during the normal engine operation. If so, the program flow follows the bypass 64. Otherwise, the EGR valve 40 is closed at step 65. In this step, the ECM 20 sends a signal 44 to the EGR controller 43 to direct the controller to close the valve 40, thereby interrupting the flow of recirculated exhaust gases back to the intake charge provided to the cylinder(s) 11. When the EGR valve is closed, the ECM directs other routines to compensate for the effect of the altered emission control, such as by injection timing. It is understood that features of the MAF sensor recalibration technique can be utilized on engines that do not include an EGR system. For those engines, steps 63–65 can be eliminated.

Once the EGR valve is closed, it is again determined whether the engine is operating at a steady state at the conditional step 66. If not, the on-line routine continues at loop 67 until the engine reaches a steady state condition. At that point, relevant data is captured in step 68 via the available sensors. In particular, the temperature and pressure of the intake charge is sensed by sensors 30 and 34 respectively, with the values being provided to the ECM 20 as signals 31 and 35. In addition, the engine speed is determined by the engine speed signal 25. In accordance with the invention, the sensed values can be instantaneous or averaged over a predetermined time interval.

The ECM 20 includes software to calculate the charge mass flow rate in step 69 according to the predetermined equation (2). The variables $P_{chg}$, N and $T_{chg}$ have been determined in the prior step 68. The value $R_{chg}$ is the gas constant of the charge mixture or the universal gas constant 8314.34 J/(kmol-K). The value $V_d$ is the engine displacement, which is a known value for the engine. This value can be hard-coded into the memory of the ECM 20.

The final value $\eta_{vol}$ is the engine volumetric efficiency. Typically, volumetric efficiency is a function of engine speed, manifold pressure ratio and charge heat transfer between the intake manifold and the cylinders. For most engines, the engine volumetric efficiency $\eta_{vol}$ can be empirically modeled. The empirical equation for the particular engine can be hard-coded into the ECM memory. One such equation can take the form of this equation:

$$\eta_{vol} = \left[1 + \frac{\left(1 - \frac{P_{Exh}}{P_{Chg}}\right)}{\gamma_{Chg}(r_c - 1)}\right]\left[\frac{T_{Chg}}{T_{Chg} + dt}\right][n_1 + n_2\omega_e + n_3\omega_e^2 + n_4\omega_e^3] + aP_{Chg}^b \quad (3)$$

Equation (3) has been established from previous work, although other formulas for volumetric efficiency may be utilized. In this equation, the variables include the intake charge pressure $P_{Chg}$, exhaust pressure $P_{Exh}$, intake charge temperature $T_{Chg}$, charge mixture specific heat ratio $\gamma_{Chg}$ and engine speed $\omega_e$. The remaining values are engineering or engine specific constants, namely the engine compression ratio $r_c$, the charge reheat parameter dt, residual gas constants a and b, and the engine speed polynomial constants $n_1$, $n_2$, $n_3$, and $n_4$.

The calculated charge mass flow rate is stored in memory in the ECM 20 in step 69. In the next step 70, the signal 51 from the MAF sensor 50 is read and conditioned by the ECM 20. It is understood that the all of the sensors, including the MAF sensor, can be read together in step 68. Software within the ECM derives a mass flow rate value in step 71 from the MAF sensor signal. Preferably, either the MAF sensor 50 or the ECM 20 includes circuitry to generate a digital signal that is usable by the ECM. Step 71 of the present routine can utilize known electronic or software techniques to obtain a mass flow rate value from the signal 51 generated by the MAF sensor 50.

In the next step 72, the sensed mass flow rate and the calculated or ideal charge mass flow rate are compared to obtain an error value. This error value can be the absolute value of the difference between the two mass flow rate values. Ordinarily, the sign of the difference between the sensed and calculated mass flow rate values is not essential. However, in some cases, the sign of this difference may be indicative of a particular error or malfunction. For example, a sensed mass airflow value that is greater than the calculated value may indicate a particular problem, depending upon the nature of the sensor 50. In most instances, the sign of the difference for a single data point may not provide sufficient information to identify the nature of the problem. Ordinarily, the sign of a family of points making up an MAF output curve would have to be considered.

In the next step 73, the error value is compared to a predetermined threshold value. If the error value is less than the threshold, it is determined that re-calibration of the MAF sensor is not required and control passes at 74 to the end step 80. The threshold value can be a predetermined value that is stored within the memory of the ECM 20. Alternatively, the threshold value can be obtained from a table look-up based upon the engine speed N, or other parameters, during the recalibration evaluation procedure, for example.

If the error value calculated in step 72 is outside the threshold value, the conditional step 73 passes the program control to step 75. In this step, an error correction factor is obtained that can be applied against the signal 51 generated by the MAF sensor 50. The error correction factor can be produced in a variety of ways. In one approach, the error correction can simply be the actual difference between the sensed and calculated mass flow rate values. However, preferably the error correction factor does not account for the entire differential between the sensed and calculated values, given that smaller errors may be involved in other sensed parameters. In one approach, the error correction factors are obtained through a look-up table as a function of the actual error value obtained in step 72.

Once the error correction factor is obtained, the factor is applied in step 76 to the signal 51 from the MAF sensor 50. In one embodiment, the correction factor is applied as a variable incorporated into the mass flow rate derivation algorithm contained within the ECM 20. In this approach, a variable value can be assigned as a multiplier or additive correction factor. This correction factor can be stored in memory within the ECM and called upon when the mass flow rate derivation algorithm is executed. In this instance, step 76 involves storing the correction factor generated in step 75 within the appropriate memory location in the ECM 20. Other alternative methods for applying a correction factor are contemplated. For example, the correction can be implemented by directly modifying the incoming signal 51, which modified signal is operated on by the mass flow rate derivation algorithm.

The present invention contemplates on-line calibration of any form of MAF sensor. For example, in the preferred embodiment the MAF sensor is a hot-wire anemometry sensor. The invention contemplates that the recalibration process is implemented by software commands executed by the ECM 20 based upon data stored in memory within the ECM. Consequently, the MAF sensor 50 must be capable of providing a signal that is readable by the ECM 20 and usable within its engine control routines. The recalibration correction can be applied at a variety of points within the ECM routine. For example, the correction can be applied to the signal 51 as it is first received by the ECM. Alternatively, the correction can be applied within the routine that derives the mass flow rate value from the MAF sensor signal 51. In addition, the error correction can be applied within engine control routines that utilize the sensed mass flow rate value.

Figure 3:
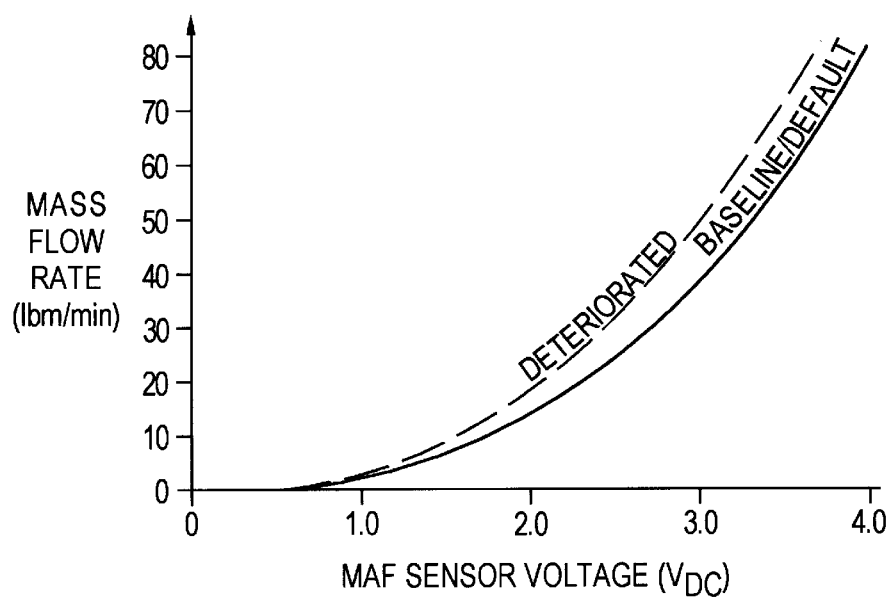
FIG. 3 is a graph showing representative MAF sensor output vs. physical mass flow rate data.
Figure 4:
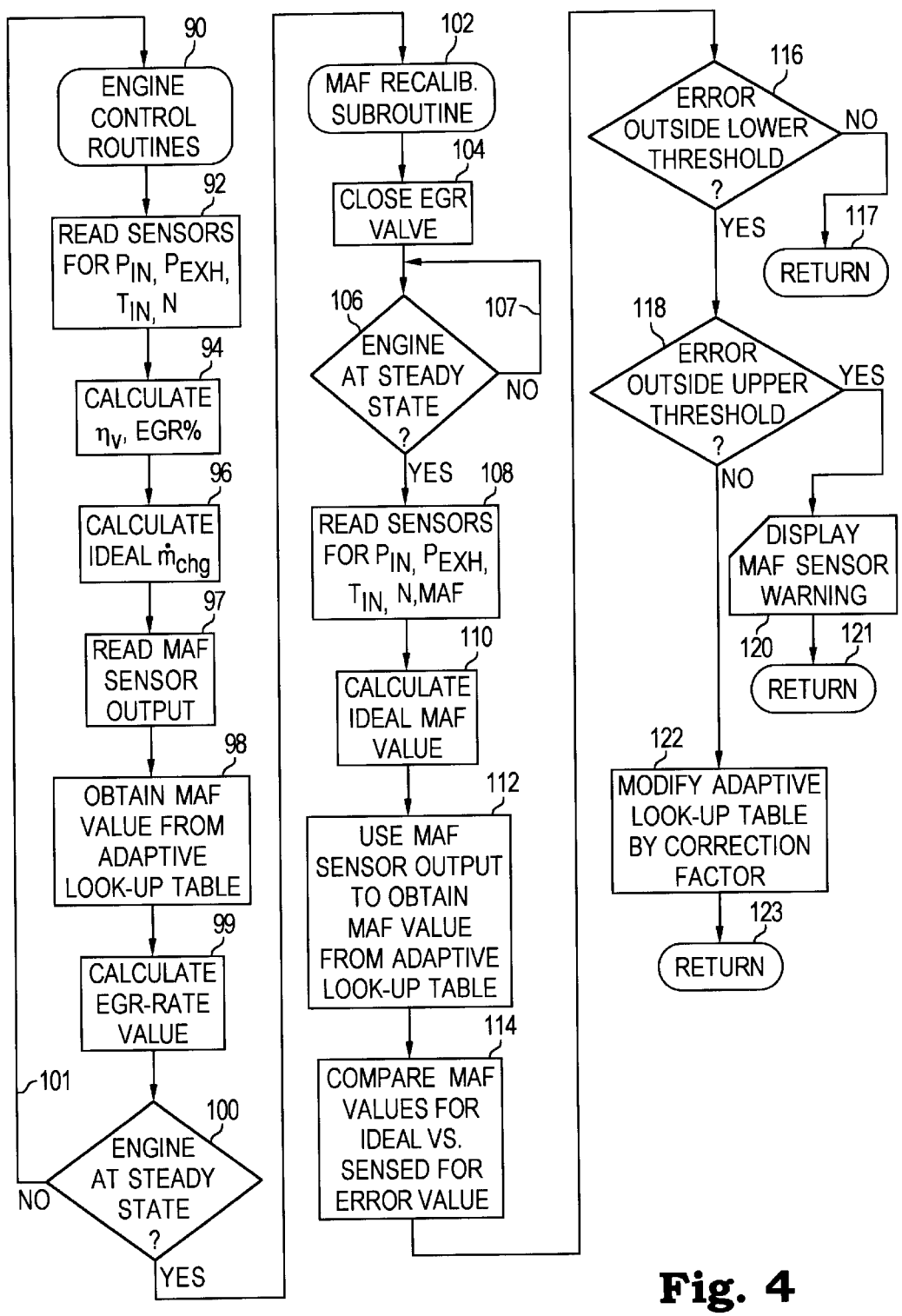
FIG. 4 is a flowchart of a sequence of steps executed by a control module in accordance with a further embodiment of the on-line MAF sensor calibration according to the present invention.

While the foregoing concerns one application of the present invention, a further embodiment can be derived from FIGS. 3–4. In accordance with this embodiment, the ECM 20 includes various processors to perform a variety of calculations related to engine performance. The processors can be software-based or in the form of integrated circuits providing an output signal indicative of a pertinent value. One such array can include processors to calculate the volumetric efficiency $\eta_{vol}$ and the percent exhaust gas recirculation (based upon the ratio of intake and exhaust pressures) that may be used by other routines executed by the ECM 20 to control the engine operation. A further processor can generate a calculated or ideal mass flow rate of the total intake charge $\dot{m}_{chg}$ being provided to the engine cylinder(s), which can include the recirculated exhaust gases and the intake air.

For the embodiment shown in FIG. 4, the ECM 20 includes a look-up table or floating-point processor that receives the output signal from the MAF sensor 50. In this embodiment, the signal is in the form of a DC voltage. This processor receives the voltage signal from the sensor and outputs a mass flow rate value in relation to that voltage. In one specific embodiment, the table look-up processor implements the curve of sensor voltage vs. mass flow rate depicted in FIG. 3. The graph in FIG. 3 includes a baseline or default curve that is based on test data for a new MAF sensor when it is received from the manufacturer. In a specific embodiment, the MAF sensor generates an output voltage of 0.0–4.0 volts DC over the engine's full airflow range. At its initial calibration, this sensor can sense flow rates up to 80 lbm/min. It should be understood that the MAF sensor baseline graph of FIG. 3 is representative of one type of sensor for a specific mass flow rate range. Other MAF sensors will have different voltage and flow rate ranges and different relationships between the two values.

The graph of FIG. 3 also depicts a second curve corresponding to the output from a MAF sensor that is affected by installation errors or has deteriorated over time. In this example, the output voltage is higher than the baseline voltage for a particular mass flow rate. For instance, a mass flow rate of 40 lbm/min. corresponds to a baseline MAF sensor output of 2.95 volts. As the sensor performance degrades, the same mass flow rate corresponds to a 2.81 volt reading from the MAF sensor. It is this signal degradation that the present invention addresses.

The look-up table processor in this embodiment electronically implements the curve shown in FIG. 3. The processor reads the MAF sensor output voltage and obtains a corresponding mass flow rate value $\dot{m}_{air}$ for the intake air. The previously calculated charge mass flow rate $\dot{m}_{chg}$ and the sensed air mass flow rate $\dot{m}_{air}$ can be provided to further processors that subtract the two values to obtain a value EGR_rate. The value EGR_rate can be divided by the charge mass flow rate to produce the EGR ratio represented in equation (1). The values EGR_rate and EGR ratio, can be supplied to other engine control algorithms executed by the ECM 20. Other engine control routines rely upon values for the mass flow rate alone.

Errors in the MAF sensor output can lead to errors in the various values supplied to critical engine operating routines. In accordance with the present invention, the look-up table processor is modified or corrected using an adaptive process in which the look-up table "evolves" as the MAF sensor output changes. In this embodiment, recalibration of the MAF sensor output is accomplished through this adaptive look-up table so that the value $\dot{m}_{chg}$ will be maintained within an acceptable tolerance range.

The ECM 20 or similar processor can be programmed to execute a series of commands shown in the flowchart of FIG. 4. Preferably, the MAF sensor recalibration features are executed as background routines to the general engine control routines 90. The engine control routines read the various engine condition sensors in step 92 and calculate the EGR percentage and volumetric efficiency values in step 94 for engines equipped with an EGR system. The ECM routines calculate an ideal charge mass flow rate value $\dot{m}_{chg}$ in step 96. In the ensuing steps 97–98, the MAF sensor output is read and processed through the adaptive look-up table to obtain a value for the intake air mass flow rate $\dot{m}_{chg}$. The flow rate values can be combined in step 99 to produce the value EGR_rate that is used by other engine control routines.

The steps 92–99 are continuously repeated during the operation of the engine. In accordance with the preferred embodiment, as these steps are executed the engine operating condition is evaluated in conditional step 100 to determine if it is operating at steady state. If not, then control passes at loop 101 back to the initial steps of the engine control routines 90. The steady state condition of the engine can be evaluated in a variety of ways. For example, steady state can be assumed if the exhaust pressure and temperature and the engine speed have remained nearly constant for a predetermined period of time. Alternatively, the conditional step 100 can be satisfied by an external signal indicative of a request to begin the MAF sensor recalibration process.

If the conditional step 100 is met, the MAF recalibration subroutine 102 is entered. Again, this subroutine can be executed as a background routine to the other more critical engine control routines implemented by the ECM 20. The initial steps 104–110 are substantially identical to the similar steps of the flowchart in FIG. 2. In other words, the recalibration subroutine closes the EGR valve, waits for engine steady state and reads the various engine condition sensors, including the MAF sensor 50. The ideal MAF value is calculated in step 110. In the following step 112, the output from the MAF sensor is processed by the look-up table processor to obtain a sensed MAF value. As explained above, the ideal calculated and sensed mass airflow values correspond to the same fluid mass, namely the intake air, since the exhaust gases are not being recirculated to the intake. Until a recalibration of the MAF sensor occurs, the adaptive look-up table includes data corresponding to the baseline or default curve shown in the graph of FIG. 3. If the installation of the MAF sensor is optimum or the sensor never deteriorates in performance, this default curve will always be used to derive the sensed MAF value.

However, like most electromechanical and thermal components, the performance of the MAF sensor 50 will degrade over time. The amount of this degradation is determined in step 114 in which the ideal and sensed mass airflow values are compared. This comparison can result in the generation of an MAF error value, as discussed above, which can be used in subsequent steps of the recalibration subroutine 102. In accordance with the present embodiment, two predetermined threshold values are applied against the MAF error value. In the conditional step 116, the MAF error value is compared to a lower threshold value. This lower threshold is indicative of an error tolerance band within which recalibration is not required. This lower threshold value can be stored within the ECM memory for reference in step 116. If the MAF error does not exceed this minimum threshold, control is returned at step 117 to the engine control routines 90.

On the other hand, if the minimum threshold is exceeded, a second test 118 is applied to determine if the MAF sensor 50 is likely defective. Thus, in conditional step 118, the MAF error value is compared with a predetermined upper threshold. This upper threshold value can be set to a value indicative of a gross failure of the MAF sensor for which recalibration would be futile. If the MAF error value exceeds this upper threshold, a warning is displayed in step 120. The warning can take many forms, such as a visual fault indicator, and can be of differing significance. For example, in an automotive engine, a failure of the MAF sensor may not require engine shut-down, since other fuel sensors and controllers are adequate to govern the operation of the engine. On the other hand, in a diesel engine, an MAF sensor failure can cause faulty calculations in the engine control routines that may result in altered emission levels, for example.

If the MAF error does not exceed the upper threshold value, engine operation can continue after the MAF sensor recalibration. Thus, in step 122 the adaptive look-up table is modified to account for the degradation in the MAF sensor output. The modification to the look-up table can be achieved in several ways, provided that the recalibration leads to a sensed MAF value that more closely approximates the ideal/calculated MAF value. In the preferred embodiment, the adaptive look-up table entries are not modified to account for the entire MAF error. For instance, the modification can be a predetermined amount or a predetermined percentage of the actual MAF error. In the most preferred embodiment, a fixed magnitude modification is applied to the look-up table entries. For example, if a MAF sensor output of 3.3 volts corresponds to a MAF rate of 40 lbm/min, while the ideal or calculated rate is 44 lbm/min., the MAF error is 4.0 lbm/min. This error indicates that an MAF sensor output of 3.3 volts should correspond to 44 lbm/min, which means that the look-up table entry for this MAF sensor voltage should be the higher value.

With the preferred embodiment, rather than substitute the correct or ideal MAF value into the 2.95 volt entry in the look-up table, only a fixed change is applied to the table. In one specific embodiment, this fixed modification can be 0.2 lbm/min. Thus, in the next cycle of engine control calculations, a 2.95 volt reading from the MAF sensor will correspond to a 40.2 lbm/min MAF value. If an additional MAF error is ascertained in this next cycle, the 2.95 volt entry in the look-up table will again be increased by the fixed amount of 0.2 lbm/min. This fixed recalibration value ensures that the sensed MAF values will not oscillate around the true value. Over several recalibration cycles, the entries in the adaptive table will approach the ideal MAF values. Of course, this adaptive table fixed recalibration value can be set at a variety of values depending upon the desired recalibration protocol.

Since the adaptive look-up table includes MAF values for a range of sensor voltages from 0.0–4.0 volts, it is possible that all MAF values will require recalibration. In the present embodiment, only a single MAF sensor output is analyzed to determine if the MAF sensor has deteriorated. This single MAF sensor output represents a single point on the mass flow rate curves shown in FIG. 3. In the specific embodiment, only this single data point is modified or corrected since the flow rate curve is non-linear and may change in a non-linear manner over time. Alternatively, the MAF value entries at other sensor voltages can be extrapolated to maintain the same non-linear relationship between voltage and MAF value. In one specific embodiment, the fixed recalibration amount can vary over the MAF values along the curve. The vector of recalibration amounts can be derived using curve-fitting approaches or based upon empirical data for sensor degradation.

After the adaptive look-up table is modified in step 122, control is returned at step 123 to the engine control routines 90. At this point, the EGR valve 40 can be opened in accordance with the prevailing engine control algorithms. The new values in the look-up table will be used during all subsequent engine control calculations until a new recalibration is requested. In the illustrated embodiment, the MAF recalibration subroutine is executed automatically when an engine steady state condition is sensed. The subroutine is executed very rapidly so the adaptive look-table can be modified without any impact on the program flow for the engine control routines relying upon MAF values. Moreover, the EGR valve can be closed without having a detrimental effect on the engine operation.

Figure 5:
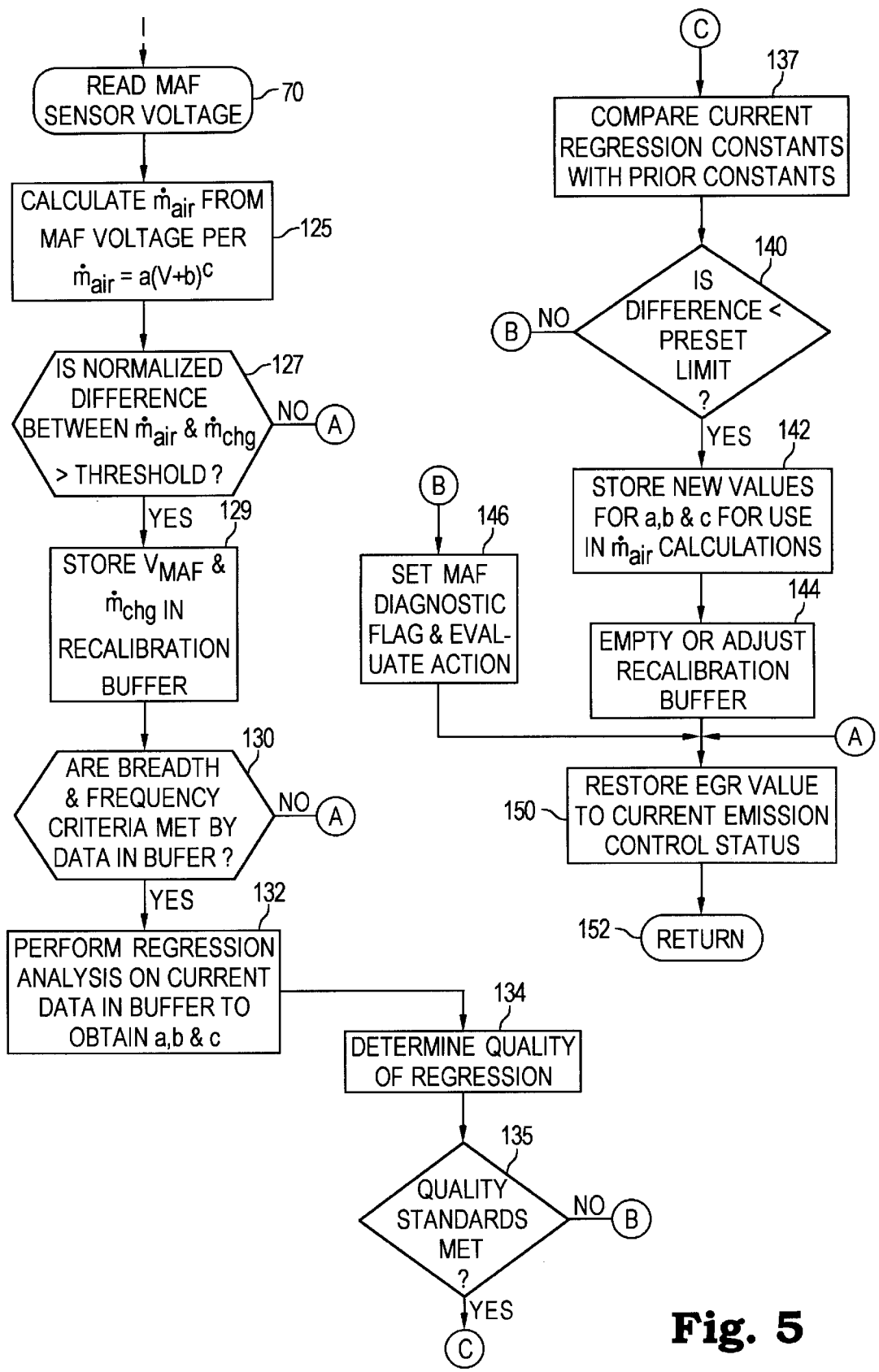
FIG. 5 is a flowchart of a sequence of steps executed in accordance with an additional embodiment of the invention utilizing regression analysis techniques.

In another embodiment of the invention, a statistical analysis approach is utilized. As depicted in the flowchart of FIG. 5, the process of this embodiment commences after the voltage generated by the MAF sensor has been obtained. Thus, the processor or ECM routine implemented with this embodiment can also apply the steps 60–70 of the embodiment shown in FIG. 2. In addition, this latter embodiment uses a modification of the adaptive look-up or floating-point table approach of the second embodiment shown in FIG. 4. With the embodiment of FIG. 5, the look-up table relies upon a non-linear equation to approximate the MAF value/MAF voltage curve depicted in FIG. 3. This equation can take the following form:

$$\dot{m}_{Air} = a(V_{MAF} + b)^c \tag{4}$$

The values a, b and c are constants derived through a regression process. For a new engine, the calibration constants can be obtained from regression analysis on a representative population of new sensors. As long as the MAF sensor 50 never deteriorates, these original calibration constants will remain unchanged throughout the life of the engine. However, the present embodiment of the invention modifies these constants to account for changes in the sensor output voltage, as depicted in the graph of FIG. 3.

With the approach of the present embodiment, the charge mass flow rate, $\dot{m}_{chg}$, is computed from available sensor information, as described above in connection with prior embodiments. In this embodiment, after the MAF sensor voltage is read in step 70, the fresh air mass flow rate, $\dot{m}_{air}$, is obtained in step 125 from equation (4) above using the current MAF sensor calibration constants. In the next step 127, a normalized absolute value comparison is made of the two flow values, $\dot{m}_{chg}$ and $\dot{m}_{air}$. If, the normalized comparison value is not greater than a predetermined error threshold, then recalibration is not warranted and the system proceeds to step 150, where the engine emission control strategy is resumed and any over-ride of EGR valve operation is nullified. Following step 150, the ECM directs control to return at step 152 to other engine control routines. In this embodiment, the sensor recalibration routine operates continuously as part of the overall engine control scheme enabled by the ECM.

If the normalized comparison exceeds the established error threshold, then the current pair of MAF sensor voltage and calculated mass flow rate [$V_{MAF\ Sensor}$, $\dot{m}_{chg}$] is submitted in step 129 to a Recalibration Buffer maintained in memory. This buffer contains pairs of sensor voltage and calculated mass flow rate gathered since the last recalibration process was completed. In one specific embodiment, the Recalibration Buffer can be sized to store ten or more pairs of data, which inherently corresponds to ten or more instances in which the normalized error of the sensed versus calculated flow rate exceeded the error threshold. Since the present embodiment contemplates using a regression analysis on these data pairs, some care should be taken to ensure to avoid concentration of data points in close proximity to each other. This can be accomplished in step 129 by filtering the new data points to reject a data pair that is too close to pairs already stored in the buffer. If the data pair is rejected, control can proceed to the return steps 150, 152.

Having added a new data pair [$V_{MAF\ Sensor}$, $\dot{m}_{chg}$] to the Recalibration Buffer, a conditional step 130 is processed where the breadth of data is assessed to assure that there is sufficient coverage of the range of possible flow rates to generate a valid MAF sensor recalibration. In other words, since a regression analysis is essentially a curve fitting technique, the data must be sufficient to produce a curve that accurately reflects actual conditions. Assessing the adequacy of the data in the Recalibration Buffer involves looking at the breadth of the data—i.e., the maximum and minimum values of $\dot{m}_{chg}$. The conditional step also looks at the frequency of data points between the maximum and minimum values—i.e., the number and spacing of the points. The breadth criteria can include: a breadth limit against which the difference between the maximum and minimum flow values is compared; a frequency limit against which the number of data pairs is compared; and a spacing limit that can be compared to the difference between adjacent sensor voltage values, for example. Other statistical techniques can be applied to evaluate adequacy of the coverage and frequency of the data pairs contained within the Recalibration Buffer.

If these criteria are met, control can pass to step 132. In an alternative, control can automatically pass to this next step if the Recalibration Buffer is filled, regardless of the breadth and frequency comparisons. If the sufficiency criteria are not met, control passes to the return steps 150, 152. Subsequent sequences through the recalibration steps will generate additional data pairs that may "fill out" the data to meet the sufficiency criteria.

If the established breadth criteria are currently met, then the system proceeds to step 132 where the regression process is carried out with the current set of recalibration data on the established MAF sensor flow/sensor voltage relationship. In this regression analysis, new values for the constants a, b and c of equation (4) above are derived. Any non-linear regression technique can be utilized to generate values for these constants. In some instances, it may be beneficial to apply a weighting factor to certain data pairs to equalize the relative weighting uniformly across the range of data. This weighting factor approach may be necessary, for example, where the frequency criterion is not optimum.

Once the regression analysis has been performed and the regression constants a, b and c calculated, the quality of the new regression is assessed in step 134. Various statistical techniques can be applied to make this determination, such as obtaining the RMS error value or the $r^2$ value to describe how well the data pairs in the Recalibration Buffer fit the modified equation (4). In the following conditional step 135, the quality factors are compared to predetermined standards to determine whether the regression values are acceptable, or whether additional data pairs must be obtained. For instance, if a perfect RMS error value is 0.00, a predetermined standard can be in the range of 0.50. For the $r^2$ value, a perfect value would be 1.000, while an acceptable predetermined standard may be 0.800.

If the regression quality criteria are not met, then control is passed to step 146 where an MAF sensor diagnostic flag is set. This flag can simply indicate that the data pairs contained within the Regression Buffer are not adequate for a proper regression analysis and therefore unacceptable for changing the existing mass flow rate/MAF voltage equation. An inability to generate a curve that fits the real-time data pairs may be indicative of a severe problem with the MAF sensor. Thus, the diagnostic flag can be used to drive a warning annunciator to trigger an off-line evaluation of the Recalibration Buffer data pairs or of the MAF sensor itself. Alternatively, the diagnostic flag can cause resetting the Recalibration Buffer to obtain new data pairs for future analysis. With this latter approach, control can pass to the return steps 150, 152.

If the regression quality is acceptable, the new regression is compared with a prior MAF sensor calibration in step 137. In one specific approach, the prior calibration is the initial sensor calibration generated when the engine was new. With this comparison, it is presumed that the flow rate/voltage curve for any given MAF sensor will not vary radically over time. Alternatively, the prior calibration can be the next prior calibration cycle. In this case, the acceptable variance between calibration constants will be smaller than with the comparison to the initial sensor calibration. As explained above, this comparison ideally involves a comparison of calculated MAF values based on the current and prior regression calibrations. Alternatively, this comparison can entail directly comparing the current values for the regression constants a, b and c with the values calculated in the prior calibration.

The conditional step 140 determines whether the variation of the new regression from the prior or original MAF sensor calibration exceeds a predetermined amount that is indicative of sensor degradation beyond which recalibration should be used as a corrective measure. In this case, control can pass to step 146 where the MAF sensor diagnostic flag is set and dealt as discussed above.

On the other hand, if the new regression is within the established limit where recalibration is the appropriate action, the conditional in step 140 is satisfied and control passes to step 142. In this step, the new MAF sensor constants a, b and c are stored in non-volatile memory and are submitted for immediate use in the equation (4) by routines responsible for air mass flow determination. In the next step 144, the Recalibration Buffer is preferably emptied in preparation for future recalibration cycles. Alternatively, the Recalibration Buffer can be implemented as a first-in-first-out buffer so that the oldest data pair is dropped out of the buffer as a new data pair is added, once the buffer has reached its limit of data pairs. With this latter approach, the regression analysis will yield smaller incremental modifications to the regression constants. Following step 144, control continues to the return steps 150, 152, where the ECM routines continue as discussed above.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, the present invention specifically contemplates a mass airflow sensor and calculations using mass as a measure of flow. The principles of the invention can have equal applicability to airflow sensors of other types that may require periodic recalibration. In accordance with the present invention, this recalibration occurs in the electronic or software driven components that receive the output signals from the sensor, rather than on the sensor itself.

Moreover, in accordance with the illustrated embodiments, the software implementing the series of steps illustrated in the flowcharts is preferably contained within the ECM. However, it is contemplated that each functional component or aspect of the present invention can be incorporated into discrete processors, which processors can be integrated into the ECM or into another microprocessor or control module. For instance, separate processors can be identified for generating a sensed airflow value from the output of the airflow sensor, for calculating an ideal airflow value, comparing the sensed and ideal airflow values, and modifying the MAF sensor voltage/airflow value relationship. In this regard, it is understood that a processor can encompass a series of software instructions or a module separate from the ECM. In some instances, the processors can be electronic, such as an integrated circuit that generates signals used by other processors.

In the illustrated embodiments, it has been assumed that the engine includes an EGR system. However, the recalibration systems and methods of the present invention can be utilized with engines that do not employ exhaust gas recirculation. The illustration in FIG. 1 is intended as a schematic representation of engine components. Thus, while only one engine cylinder is shown in this figure, it is understood that the present invention can be readily used with multi-cylinder engines. Furthermore, the MAF sensor can be interposed at the inlet to an intake manifold that supplies air to a number of cylinders. In this case, the pressure and temperature sensors can be disposed at a position in the intake manifold upstream of the branches to the individual cylinder.

What is claimed is:

1. A method for recalibrating values generated by an airflow sensor disposed at an air intake of an engine, the engine having an exhaust gas recirculation (EGR) system with a recirculation path between the engine exhaust and the air intake downstream of the airflow sensor and an EGR valve interposed in the recirculation path, and the engine further having an engine control module (ECM) operable to execute algorithms for controlling the engine operation based upon signals from sensors and airflow values from the airflow sensor, comprising the steps of:

closing the EGR valve;

obtaining a sensed airflow value according to a predetermined relationship with the signals from the airflow sensor when the EGR valve is closed;

generating an ideal airflow value from signals generated by sensors other than the airflow sensor when the EGR valve is closed;

comparing the sensed airflow value with the ideal airflow value and generating an output indicative of the comparison; and based on the output from the comparison, modifying the predetermined relationship of the sensed airflow values to the airflow sensor signals for subsequent use by the ECM.

2. The method according to claim 1, wherein:

the predetermined relationship is embodied in an equation relating the airflow sensor signals to the sensed airflow value, the equation including a number of constants stored in a memory; and the step of modifying the predetermined relationship includes modifying the number of constants.

3. The method according to claim 2, further including the steps of:

providing a recalibration buffer for storing associated data pairs including the ideal airflow value and the magnitude of the airflow sensor signal; and when the EGR valve is closed, storing the ideal airflow value and the magnitude of the airflow sensor signal in the recalibration buffer;

wherein, the step of modifying the predetermined relationship includes;

performing a regression analysis on the associated data pairs to calculate modified ones of the number of constants; and storing the modified ones of the number of constants in memory for subsequent calculation of a sensed airflow value to be supplied to the engine control algorithms.

4. The method according to claim 3, wherein;

the modifying step includes evaluating the regression analysis to determine if the analysis meets predetermined quality standards; and the storing step includes storing the modified constants in memory only if the quality standards are met.

5. The method according to claim 3, wherein the steps prior to the step of modifying the predetermined relationship are repeated at least two times so that the recalibration buffer includes at least two associated data pairs.

6. The method according to claim 5, wherein;

the modifying step includes evaluating the regression analysis to determine if the analysis meets predetermined quality standards; and the steps prior to the modifying step are repeated until the quality standards are met by the regression analysis.

7. The method according to claim 1, wherein:

the predetermined relationship is embodied in a look-up table stored in a memory of the ECM, the look-up table relating the magnitude of signals from the airflow sensor to a sensed airflow value indicative of the airflow through the airflow sensor; and the step of obtaining a sensed airflow value includes determining the magnitude of the airflow sensor signal and extracting a sensed airflow value from the look-up table based on the magnitude.

8. The method according to claim 7, wherein the step of modifying the predetermined relationship includes modifying the sensed airflow values in the look-up table in relation to the error value.

9. The method according to claim 8, wherein the step of modifying the predetermined relationship includes modifying the sensed airflow values in the look-up table as a percentage of the error value.

10. The method according to claim 8, wherein the step of modifying the predetermined relationship includes modifying the sensed airflow values in the look-up table by a fixed value less than the error value.

11. The method according to claim 1, wherein the step of generating an ideal airflow value includes the steps of:

obtaining an intake temperature value from a temperature sensor at the engine intake downstream of the exhaust gas recirculation path;

obtaining an intake pressure value from a pressure sensor at the engine intake downstream of the exhaust gas recirculation path;

generating the ideal airflow value according to a predetermined relationship based on the intake temperature and pressure values.

12. The method according to claim 1, wherein the comparing step includes:

comparing the difference between the ideal airflow value and the sensed airflow value to a predetermined threshold value; and modifying the predetermined relationship only if the difference exceeds the threshold value.

\* \* \* \* \*

UNITED STATES PATENT AND TRADEMARK OFFICE
CERTIFICATE OF CORRECTION

PATENT NO.    : 6,370,935 B1                              Page 1 of 1
DATED         : April 16, 2002
INVENTOR(S)   : He et al.

It is certified that error appears in the above-identified patent and that said Letters Patent is hereby corrected as shown below:

Column 8,
Line 63, please delete "n&$_{chg}$" and insert -- m$_{chg}$ --.

Signed and Sealed this

Eighteenth Day of February, 2003

JAMES E. ROGAN
*Director of the United States Patent and Trademark Office*